Aug. 9, 1966    J. E. HARRIS    3,265,303
TEMPERATURE REGULATING VALVE
Filed April 14, 1964
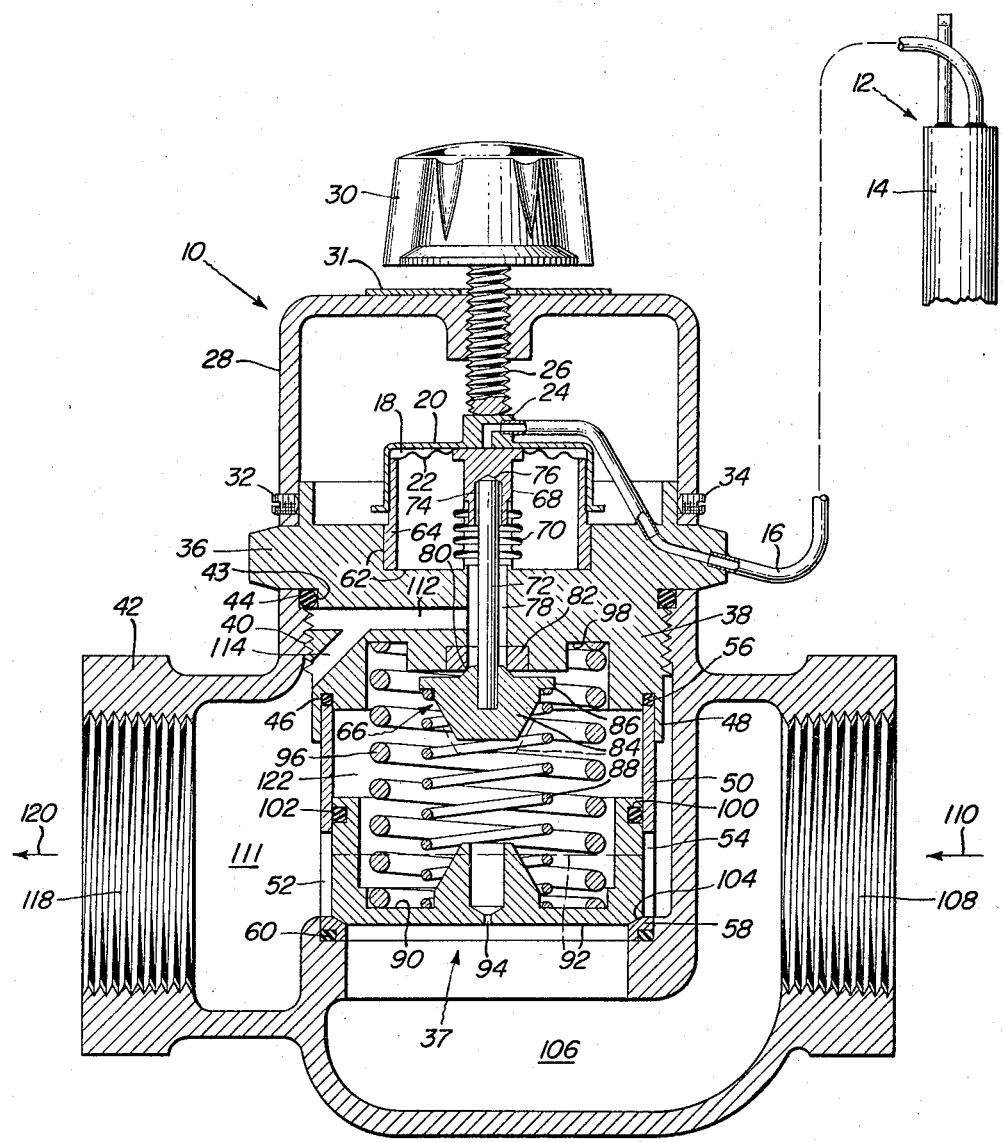
INVENTOR.
JAMES E. HARRIS
BY Arthur H. Swenson
ATTORNEY.

3,265,303
TEMPERATURE REGULATING VALVE
James E. Harris, Fort Washington, Pa., assignor to Honeywell Inc., a corporation of Delaware
Filed Apr. 14, 1964, Ser. No. 359,726
7 Claims. (Cl. 236—80)

The general object of the present invention is to provide a self-contained temperature regulating valve that is particularly useful in the control of fluids employed in hot and cold fluid heating and cooling systems.

More specifically, it is another object of the present invention to disclose a modulating type of valve that employs a balancing spring between a plug portion of a cage valve and a pilot valve plug that is actuated by changes in pressure of a thermal system that is used to sense temperature changes.

It is still another object of the present invention to employ a unique feedback force balancing spring and plug for the aforementioned modulating valve that will enable the plug of the cage valve to be brought to a pressure balanced position in a rapid stable manner and which will also provide a precise repeatable modulating type of control for the fluid passing through the valve.

It is still another object of the present invention to provide a modulating valve of the aforementioned type that has the unique characteristic of being compact, since it combines a pilot valve and a main valve within a single casing.

A better understanding of the present invention may be had from the following detailed description when read in connection with the accompanying drawing.

Referring to the single figure shown in the drawing, there is disclosed a modulating valve 10. The valve is comprised of a thermal system 12 which has an expansible, fluid-filled bulb 14, capillary tube 16, and a chamber 18 whose walls are formed by a cup-shaped member 20 and a diaphragm 22 whose peripheral surface is attached in a fluid-tight manner thereto by, for example, a seam weld.

A boss 24 is formed at the top portion of the cup 20 and has the lower end of a shaft 26 that, under normal operating conditions, remains in physical surface-to-surface contact therewith. The shaft 26 is shown threadedly mounted for rotatable movement in a cover 28 and having an adjusting knob 30 fixedly attached to it at its upper end for varying the set point level of temperature measurement at which the thermal system 12 will effect an opening or closing control action of the valve 10. A set point indicating plate 31 is employed to assist the operator in seeing the magnitude of the set point adjustment that he has made. The lower end of the cover 28 is fixedly attached by means of set screws 32, 34 to the hex-shaped block 36 which forms a bonnet for the main valve 37.

A portion of the block 36 that is adjacent its lower end has a cylindrically-shaped portion 38 that is threadedly engaged at 40 with the main valve body 42.

The upper end of the cylindrical portion 38 of block 36 is recessed at 46 to accommodate an O-ring seal 44 between it and an adjacent portion of the main valve body 42.

The lower end of the cylindrical portion 38 of the block 36 has a circumferential recessed portion 46 and a circumferential lip 48 for retaining the upper end of a cylindrically-shaped cage member 50, containing ports 52, 54, in compressed contact with the cylindrically-shaped O-ring 56. The lower end of the cage member 50 forms a main valve ring seat at 58. The seat 58 is shown being retained by block 36 in compressed contact with a sealing ring 50 that is supported by the main valve body 42.

The upper end of the block 36 has a wall 62 forming a central, hollowed-out recessed portion for slidably retaining the lower end of a diaphragm supporting sleeve member 64 therein.

A pilot valve unit 66 is employed within the main valve casing 42 and the block 36. This pilot valve unit 66 is comprised of a cylindrical bellows cap 68 whose upper end is in surface-to-surface contact with the lower surface of the diaphragm 22 and whose lower end is in fluid-tight sealing engagement with the lower surface of the recessed wall portion 62.

The pilot valve unit 66 is also comprised of a stem 72 passing through a central bored-out portion 74 in the bellows cap 68 and engaged in a cone-shaped surface-to-surface contact at 76 for movement therewith. The central longitudinal portion of this stem 72 extends through the vertical passageway 78 in the block 36 and the central apertured wall portion 80 in a pilot valve seat ring 82.

The lower end portion of the stem 72 rotatably supports the plug 84 of pilot valve 66. The plug 84 of the pilot valve 66 is provided with a cylindrical flange 86 that retains a feedback force balancing spring 88 in compressed engagement with the inner surface 90 of a main valve plug 92.

The lower, central surface of the hollow main valve plug 92 is provided with an orifice 94. One end of a spring biasing member 96 is in compressed contact with the wall surface portion 90 of the main valve plug 92, and the opposite end of this biasing member 96 is in compressed contact with a cylindrically-shaped surface 98 of the bonnet 36.

The entire cylindrical side wall surface of the main valve plug 92 is provided with a recess 100 for retaining an O-ring seal 102, that is shown protruding therefrom, so that the main valve plug 92 can be moved in slidably sealing contact along the inner surface of the case 50.

The entire lower, outer, tapered end surface 104 of the main valve plug 92, as shown in solid line form, is in fluid-tight engagement with its associated main valve seat 58 when the main valve is in a closed position. When the main valve is in the open position, the lower surface of the plug will be displaced in an upward direction to, for example, the position such as is indicated in dotted line form for this plug 92.

The main valve body 42 is provided with a chamber 106 that will contain the fluid under pressure at the upstream side of the valve that is transmitted through the threaded wall 108 in the direction of the arrow 110.

The main valve body 42 is also provided with a chamber 111 that will contain the fluid under pressure at the downstream side of the valve that is transmitted from the valve through the slots, for example, 52, 54 and by way of aperture 80, passageway 78, 112, 114. This fluid is then passed through the threaded wall 118 in the direction of the arrow 120.

In the operation of the self-contained, temperature-modulated valve, an increase in temperature of bulb 14 will cause the fluid therein to expand and flow under pressure through capillary tube 16 and thereby apply a force which will move the diaphragm 22 in a downward direction. This diaphragm movement will thus cause the plug 84 of the pilot valve 66 to be moved to an open, unseated position. This action will thereby permit the fluid in the chamber 118 to flow over the seat ring 82, through the passageways 78, 112, 114 into the chamber 111 into the downstream side of the valve 10. When the fluid in the upstream main valve chamber 106 passes through orifice 94, it will cause a pressure drop in the chamber 122 that becomes lower than the upstream pressure of the fluid in the upstream valve chamber 106. This pressure difference creates a force that will lift plug 92 off of its seat 58 and move it to, for example, its dotted line position where a flow of fluid will then be able to take place through ports 52, 54. The force acting on the pilot valve 66 and the aforementioned main valve 37 will be opposed by a biasing spring 96 and feedback spring 88. The main valve plug 92 will continue to be rapidly opened until the force associated with the deflection of the feedback spring 88 balances the force now being applied by the diaphragm 22 which results in a precisely selected stable modulating flow level of fluid for the particular temperature being sensed by the fluid-filled bulb 14.

A decrease in temperature or, in other words, cooling of the bulb 14 will cause an opposite action to that just disclosed; namely, it will cause closing of the plug 84 of the pilot valve 66. This action will also reduce the flow of the fluid passing through passageways 78, 112, 114 and the bias spring 96, and feedback spring 88 will, under this decreased temperature condition, force the plug 92 toward seat 58 and thereby effect a closing action of the main valve 37.

From the aforementioned description, it can be seen that a unique modulating valve has been disclosed that employs a feedback force balancing spring between a force-applying, diaphragm-actuated valve plug associated with a temperature-sensing thermal filled system and a plug of a main valve to enable the main valve plug to be rapidly brought to a different balanced position for each change in the level of temperature being sensed. This action, thus effects a precise proportional change in the regulation of the magnitude of the rate of flow of fluid passing through the main valve for each change that occurs in the temperature being sensed by the thermal filled system.

What is claimed is:

1. A modulating valve comprising, a valve body having an inlet chamber adapted to be connected to an upstream portion of a flowing stream of fluid under pressure and an outlet chamber adapted to be connected to the downstream portion of the fluid stream, a sleeve containing ports in its side wall portion and a seat ring adjacent one end thereof adapted to be seated in fluid-tight engagement with a valve body portion that is adjacent said inlet chamber, a bonnet connected to the body and having a lower surface thereof in surface-to-surface contact with the other end of the sleeve, a plug positioned for sliding movement within and along the sleeve portion containing the ports toward and away from the seat ring to alter the flow of fluid between the inlet chamber and the outlet chamber, a compression spring positioned between the bonnet and said plug, a fluid-restricting passageway in said plug to bleed the fluid in the inlet chamber into the chamber formed by the inner wall surfaces of the plug, sleeve and bonnet, a passageway in said bonnet between said last-mentioned chamber and the outlet chamber, a second plug operably connected to a temperature-responsive means at one end and positioned adjacent the last-mentioned passageway at its other end for movement away from one end of the last-mentioned passageway to increase the rate of flow of fluid passing therethrough as the temperature being sensed by the temperature-responsive means is increased, said second plug being further operably connected for movement by the temperature-responsive means toward the one end of the last-mentioned passageway to decrease the rate of flow of fluid passing therethrough as the temperature being sensed by the temperature-responsive means is decreased, and a feedback balancing spring connected at one end for movement with the last-mentioned plug and connected at its other end for movement with the inner surface of the first-mentioned plug.

2. A modulating valve comprising, a valve body, a bonnet, a sleeve having a sealing ring at one end and ports in its side wall portion, said bonnet being positioned to retain the sleeve in a fixed position against an inner wall of said body, a plug positioned for slidable engagement along the ported inner wall surface of the sleeve, a fluid inlet chamber and a fluid outlet chamber formed by spaced-apart wall portions of the body, a flow-restricting passageway passing through the wall of the plug and opening at one end into the inlet chamber, a passageway in the bonnet extending between a third chamber formed by the inner wall surfaces of the sleeve, plug and bonnet and said outlet chamber, a pilot valve plug positioned in the third chamber adjacent said last-mentioned passageway, temperature-responsive means operably connected with said pilot valve plug to move the plug into a fluid-restricting position in the last-mentioned passageway while the temperature being sensed by said temperature-responsive means is decreased and being operable to move the plug away from said fluid restricting position toward a less restricted position when the temperature being sensed by said temperature-responsive means is increased, a first compression spring extending between the bonnet and the inner end surface of the first-mentioned plug and a force balance spring extending between the pilot plug and the inner end surface of the first-mentioned plug.

3. A unitary cage and pilot valve structure to precisely regulate the flow of a fluid passing from the upstream to downstream side of the valve to a level that is proportionate to the temperature of a condition being sensed by a temperature-responsive means comprising, a sleeve having a plurality of ports in its side wall and a cylindrical seat ring which forms one inner end portion thereof, a valve plug positioned for movement along the inner wall surface of the sleeve, a restricted passageway adapted to connect a chamber formed by the inner surface of the sleeve and the inner wall of the plug to the fluid pressure on the upstream side of the valve, a spring positioned within the valve body for normally biasing the plug into seated engagement with the seat ring, a passageway adapted to connect the chamber formed within the inner wall of the sleeve and plug with the fluid pressure on the downstream side of the valve, a second plug forming a part of said pilot valve structure operably connected to the temperature-responsive means for movement into and out of the last-mentioned passageway in accordance with changes occurring in the magnitude of the temperature being sensed by said temperature-responsive means, and a feedback force balancing spring extending between the second plug and the inner wall of the first-mentioned plug.

4. A unitary cage and pilot valve structure to precisely regulate the rate of flow of a fluid passing from the upstream to downstream side of the valve to a level that is proportionate to the temperature of a condition being sensed by a temperature-responsive means, the improvement comprising the provision of a restricted passageway connecting a chamber comprised of an inner wall of a plug and an associated inner wall of a cage with the fluid pressure on the upstream side of the valve, a passageway connecting the chamber with the fluid pressure on the downstream side of the valve, a plug of a pilot valve operably connected for movement with a temperature-responsive means into and out of preselected restricted positions with one end of the last-mentioned passageway, a spring biased plug mounted for slidable movement within the chamber, and a force balance feedback spring positioned for compressed movement at one of its ends by the plug of the pilot valve and positioned for substantially simultaneous compressed movement at its other end by the plug that is in slidable engagement with the cage.

5. A modulating valve for proportionally regulating the rate of flow of a flowing fluid in accordance with changes occurring in the magnitude of a variable condition comprising, a valve body having an inlet chamber, an outlet chamber and a third chamber positioned between the inlet and outlet chambers, a passageway extending between the third chamber and the outlet chamber, a pilot valve having a movable portion operably positioned in the third chamber and connected to a condition-responsive means to regulate the degree to which the passageway is opened in accordance with the magnitude of the condition, a perforated sleeve forming a wall portion of the third chamber, a spring biased portion positioned within the sleeve and having a movable end wall portion whose inner surface forms an inner wall surface of said third chamber, a fluid-restricting passageway between the inlet and the third chamber, a resilient force balancing means extending between the two movable portions for movement therewith, the movable portion of the pilot valve being comprised of a plug adjacent the first-mentioned passageway at one end and is operably connected at its other end for movement with a thermal unit that is employed to sense the magnitude of the condition.

6. A modulating valve for proportionally regulating the rate of flow of a flowing fluid in accordance with changes occurring in the magnitude of a variable condition comprising, a valve body having an inlet chamber, an outlet chamber and a third chamber positioned between the inlet and outlet chambers, a passageway extending between the third chamber and the outlet chamber, a pilot valve having a movable portion operably positioned in the third chamber and connected to a condition-responsive means to regulate the degree to which the passageway is opened in accordance with the magnitude of the condition, a perforated sleeve forming a wall portion of the third chamber, a spring biased portion positioned within the sleeve and having a movable end wall portion whose inner surface forms an inner wall surface of said third chamber, a fluid-restricting passageway between the inlet and the third chamber, a resilient force balancing means extending between the two movable portions for movement therewith, the movable portion of the pilot valve being comprised of a plug adjacent the first-mentioned passageway at one end, another end of the plug is operably connected for movement with a thermal unit that generates a force that is proportional to the magnitude of the condition, and a mechanical means is operably connected to the plug to adjust its position and to thereby vary the set point level at which the thermal unit will effect a plug opening or closing control action of the pilot valve.

7. In a unitary cage and pilot valve structure to precisely regulate the rate of flow of a fluid passing from the upstream to downstream side of the valve to a level that is proportionate to the temperature of a condition being sensed by a temperature-responsive means, the improvement comprising the provision of a restricted passageway connecting a chamber comprised of an inner wall surface of a plug and an associated inner wall surface of a cage with the fluid pressure on the upstream side of the valve, a passageway connecting the chamber with the downstream side of the valve, a tapered plug of a pilot valve operably connected for movement with a temperature-responsive means into and out of a restricted position with one end of the last-mentioned passageway, a spring-biased plug mounted for slidable movement within the chamber, and a force balance feedback spring positioned for compressed movement at one of its ends by the tapered plug of the pilot valve and positioned for compressed movement at its other end by the plug that is in slidable engagement with the cage.

References Cited by the Examiner
UNITED STATES PATENTS

| | | | |
|---|---|---|---|
| 474,244 | 5/1892 | Hanson | 137—491 |
| 1,286,872 | 12/1918 | Cash | 137—489.3 |
| 1,925,301 | 9/1933 | Campbell. | |
| 2,111,230 | 3/1938 | Toussaint. | |
| 2,387,225 | 10/1945 | Beekley. | |

ALDEN D. STEWART, *Primary Examiner.*